US010075048B2

(12) United States Patent
Jeong et al.

(10) Patent No.: US 10,075,048 B2
(45) Date of Patent: Sep. 11, 2018

(54) MOTOR AND WASHING MACHINE HAVING THE SAME

(71) Applicant: Samsung Electronics Co., Ltd., Gyeonggi-do (KR)

(72) Inventors: Su Kwon Jeong, Gyeonggi-do (KR); Young Kwan Kim, Gyeonggi-do (KR); Keun Young Yoon, Gyeonggi-do (KR); Jae Woong Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 214 days.

(21) Appl. No.: 14/911,013

(22) PCT Filed: Aug. 7, 2014

(86) PCT No.: PCT/KR2014/007324
§ 371 (c)(1),
(2) Date: Feb. 8, 2016

(87) PCT Pub. No.: WO2015/020454
PCT Pub. Date: Feb. 12, 2015

(65) Prior Publication Data
US 2016/0204682 A1 Jul. 14, 2016

(30) Foreign Application Priority Data

Aug. 8, 2013 (KR) .......................... 10-2013-0094068

(51) Int. Cl.
H02K 11/215 (2016.01)
H02K 29/08 (2006.01)
(Continued)

(52) U.S. Cl.
CPC ........... H02K 11/215 (2016.01); D06F 37/30 (2013.01); D06F 37/304 (2013.01); H02K 7/14 (2013.01); H02K 29/08 (2013.01)

(58) Field of Classification Search
CPC .............................. H02K 11/215; H02K 29/08
See application file for complete search history.

(56) References Cited

U.S. PATENT DOCUMENTS 6,727,632 B2 * 4/2004 Kusase .................... H02K 1/27
310/112
6,977,453 B2 * 12/2005 Yoda .................... H02K 11/048
310/156.26
(Continued)

FOREIGN PATENT DOCUMENTS

CN 1626720 A 6/2005
CN 1744413 A 3/2006
(Continued)

OTHER PUBLICATIONS

International Search Report dated Nov. 17, 2014 in connection with International Application No. PCT/KR2014/007324; 6 pages.
(Continued)

Primary Examiner — Dang Le

(57) ABSTRACT

The present invention provides a motor and a washing machine including the same. The motor according to an embodiment of the present invention includes a hall sensor which is positioned on the upper surface of a rotor and detects the position of a magnet provided in the rotor by using the leakage magnetic flux of the magnet, and thereby can accurately detect the position of the rotor by the hall sensor.

17 Claims, 12 Drawing Sheets

(51) Int. Cl.
*D06F 37/30* (2006.01)
*H02K 7/14* (2006.01)

(56) References Cited

U.S. PATENT DOCUMENTS

| | | | |
|---|---|---|---|
| 7,245,051 B2 | 7/2007 | Hosono et al. | |
| 8,169,112 B2* | 5/2012 | Zhang | H02K 11/215 310/68 B |
| 2005/0126230 A1 | 6/2005 | Choi | |
| 2006/0261690 A1* | 11/2006 | Petersen | H02K 3/28 310/68 B |
| 2007/0046122 A1* | 3/2007 | Makiuchi | H02K 29/08 310/156.05 |
| 2008/0122300 A1* | 5/2008 | Cho | H02K 1/148 310/43 |
| 2010/0050702 A1* | 3/2010 | Kim | D06F 37/304 68/23 R |
| 2012/0131753 A1 | 5/2012 | Duckworth et al. | |
| 2012/0181967 A1 | 7/2012 | Fulton et al. | |

FOREIGN PATENT DOCUMENTS

| | | |
|---|---|---|
| CN | 102025252 A | 4/2011 |
| CN | 102594030 A | 7/2012 |
| JP | 2010-226848 A | 10/2010 |
| JP | 2012-217269 A | 11/2012 |
| KR | 10-2000-0012929 A | 3/2000 |
| KR | 10-2013-0044758 A | 5/2013 |

OTHER PUBLICATIONS

Written Option of the International Searching Authority dated Nov. 17, 2014 in connection with International Application No. PCT/KR2014/007324; 8 pages.
Office Action dated Mar. 3, 2017 in connection with Chinese Patent Application No. 2014800446383.
Office Action dated Oct. 23, 2017 in connection with Chinese Patent Application No. 201480044638.3.

* cited by examiner

MOTOR AND WASHING MACHINE HAVING THE SAME

TECHNICAL FIELD

The present invention relates to a motor in which a hall sensor is mounted and a washing machine having the same.

BACKGROUND ART

A motor is an apparatus configured to obtain rotational force from electric energy, and includes a stator and a rotor. The rotor is configured to electromagnetically interact with the stator, and is rotated by a force acting in between a magnetic field and a current that flows in coils.

Permanent magnet motors using a permanent magnet for generating a magnetic field can be divided into a surface mounted permanent magnet motor, an interior type permanent magnet motor, and a spoke type permanent magnet motor.

Among them, the spoke type permanent magnet motor structurally has a high magnetic flux concentration, so it has an advantage in generating high torque and high power and being manufactured in a small size compared with other motors at the same power. The spoke type permanent magnet motor can be applied to washing machine driving motors, electric vehicle driving motors, or small-sized power generators, in which high torque and high power are required.

In a stator, a coil is wound many times, and in a rotor, magnets and rotor cores may be alternately disposed. The rotor may be rotated by electromagnetic force generated between the coil and the magnet when a current flows in the coil.

In a motor, a hail sensor configured to sense a position of the magnets provided in the rotor may be provided. When the position of the magnets is sensed by the hall sensor, a controller controls the flow of the current flowing to the stator coil based on the sensed information, and rotates the rotor.

In the case of the conventional art, a hall sensor is provided between a magnet and a gap of a stator which is at a physically shortest distance from the hall sensor to ease sensing of the position of the magnet provided in the rotor. In this case, when power is applied to the stator and the motor is actually driven, detection signals of the hall sensor may sometimes be distorted due to an influence of the electromagnetic field generated around the stator coil.

DISCLOSURE

Technical Problem

According to one embodiment of the present invention, a motor and a washing machine having the same in which a hall sensor enables accurate sensing of a position of a rotor by locating the hall sensor at an upper surface of the rotor to sense a position of a magnet using leakage magnetic flux of the magnet include in the rotor can be provided.

Technical Solution

A washing machine according to one embodiment of the present invention includes: a tub; a drum rotatably disposed inside the tub; a motor coupled to an outside of the tub to rotationally drive the drum, and comprising a stator and a rotor; a hall sensor assembly detachably mounted in the motor; and a hall sensor provided on the hall sensor assembly, and positioned at a front of the rotor to sense a leakage magnetic flux of a magnet which is included in the rotor.

An insertion hole may be formed at the hall sensor assembly, a hook may be formed to protrude at the stator, and the hall sensor assembly may be mounted in the motor by inserting the hook to the insertion hole.

A movement preventer may be formed to protrude at the stator, a movement prevention groove may be formed at the hall sensor assembly, and the hall sensor assembly is fixed not to move by inserting the movement preventer to the movement prevention groove.

A movement preventer may be formed to protrude at the stator, a holder may be provided at the hall sensor assembly, and the movement preventer is inserted into the holder and fixed, so that the hall sensor assembly is fixed not to move.

The stator may be positioned at an outer side of the rotor.

The stator may include a plurality of insulator teeth protruding toward the rotor, and a hook may be formed to protrude at an end of the insulator teeth.

A protrusion formed at an insertion hole may be formed at the hall sensor assembly, and the hook is inserted into the insertion hole to fix the hall sensor assembly.

An interferer may be formed to protrude at an end of the insulator teeth, and the protrusion is fixed not to move by the interferer when the hook is inserted into the insertion hole.

The washing machine according to claim 8,

A fixer may be provided to protrude at the hall sensor assembly, and when the hook is inserted into the insertion hole, the interferer is inserted between the protrusion and the fixer, so that the hall sensor assembly is fixed.

The hall sensor assembly may be mounted in the stator, and the hall sensor provided on the hall sensor assembly may be positioned at the front of the rotor spaced apart from the rotor.

A rail groove may be formed at the hall sensor assembly, a rail may be formed at the stator, and the hall sensor assembly is mounted in the stator by sliding the hall sensor assembly along the rail while the rail is inserted into the rail groove.

The rail may include a first rail vertically formed from an outer surface of the stator, and a second rail vertically formed at the first rail.

The rotor may be provided on an outer side of the stator.

A rib protruding forward may be formed at the stator.

A movement preventer is formed to protrude at the hall sensor assembly, and the movement preventer is interfered with by the rib to fix the hall sensor assembly not to move.

A motor according to one embodiment of the present invention, the motor includes: an insulator in which a coil is wound and a stator having a plurality of insulator teeth protruding from the insulator; a rotor in which a magnet and a rotor core are alternately arranged; a hall sensor assembly detachably mounted in the stator; and a hall sensor accommodated in the hall sensor assembly and sensing a leakage magnetic flux of the magnet at a front of the rotor.

A hook may be formed to protrude at the insulator, an insertion hole may be formed at the hall sensor assembly, and the hall sensor assembly is fixed to the insulator by inserting the hook to the insertion hole.

A rail may be formed at the insulator, a rail groove may be formed at the hall sensor assembly, and the hall sensor assembly is fixed to the insulator by sliding the hall sensor assembly with the rail while the rail is inserted into the rail groove.

The hall sensor assembly and the insulator may include a movement prevention structure for preventing the hall sensor assembly from moving.

The hall sensor assembly may be formed of plastic material by injection-molding.

Advantageous Effects

In a motor and a washing machine having the same according to one embodiment of the present invention, a hall sensor is positioned at an upper portion of a rotor to have sufficient distance from the rotor, and detects leakage magnetic flux of a magnet, so that the position of the magnet is accurately detectable and the motor may be smoothly driven. Since the hall sensor is installed by hooking, sliding, etc., the hall sensor is easily detachable, and is easily fixed when an error occurs.

MODES OF THE INVENTION

Figure 1:
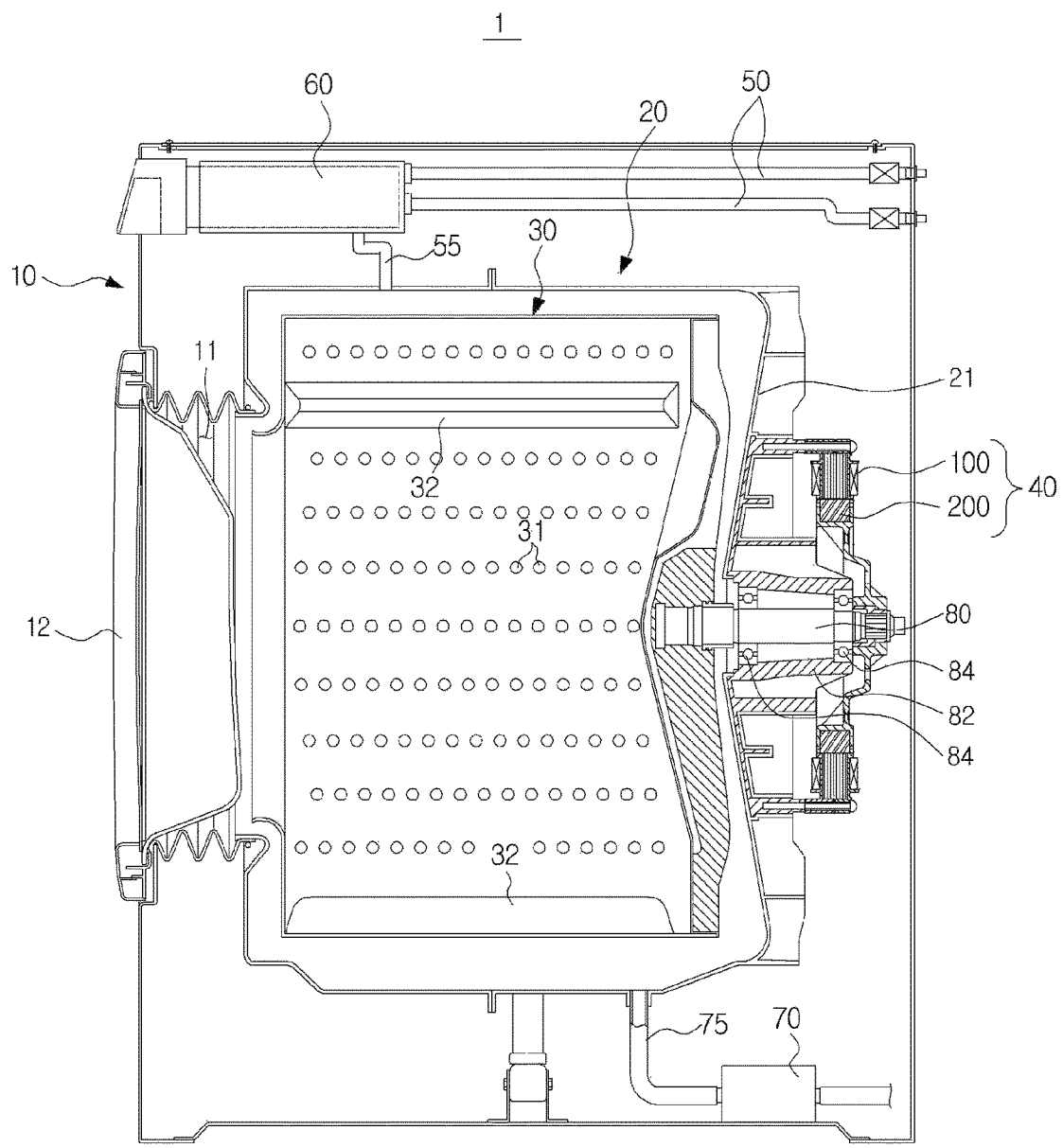
FIG. 1 is a view illustrating a washing machine according to one embodiment of the present invention.

Hereinafter, a detailed description will be given of a motor and a washing machine having the same according to one embodiment of the present invention referring to the drawings.

FIG. 1 is a view illustrating the washing machine according to one embodiment of the present invention.

As illustrated in FIG. 1, a washing machine 1 includes a cabinet 10 forming an exterior of the washing machine, a tub 20 disposed inside the cabinet 10, a drum 30 rotatably disposed inside the tub 20, and a motor 40 rotatably driving the drum 30.

At a front surface portion of the cabinet 10, an inlet 11 configured to put laundry into the drum 30 is formed. The inlet 11 is opened and closed by a door 12 installed at the front surface portion of the cabinet 10.

At an upper portion of the tub 20, a water supply pipe 50 is installed to supply washing water to the tub 20. One side of the water supply pipe 50 is connected to an external water supply source (not shown), and the other side of the water supply pipe 50 is connected to a detergent supply apparatus 60. The detergent supply apparatus 60 is connected to the tub 20 through a connection pipe 55. The water being supplied through the water supply pipe 50 passes through the detergent supply apparatus 60, and is supplied to the inside of the tub 20 along with a detergent.

At a lower portion of the tub 20, a drain pump 70 and a drain pipe 75 configured to discharge the water at the inside of the tub 20 to the outside of the cabinet 10 are installed.

Around the drum 30, a plurality of through holes 31 are formed to circulate washing water, and at an inner circumferential surface of the drum 30, a plurality of lifters 32 are installed to move the laundry up and down when the drum 30 is rotated.

The drum 30 is connected to the motor 40 through a drive shaft 80. The drive shaft 80 is configured to deliver the rotational force of the motor 40 to the drum 30. One end of the drive shaft 80 is connected to the drum 30, and the other end of the drive shaft 80 is extended to an outer side of a rear wall 21 of the tub 20.

At the rear wall 21 of the tub 20, a bearing housing 82 is installed to rotatably support the drive shaft 80. The bearing housing 82 may be formed of an aluminum alloy, and may be inserted into the rear wall 21 of the tub 20 when injection-molding the tub 20. Between the bearing housing 82 and the drive shaft 80, bearings 84 are installed to smoothly rotate the drive shaft 80.

Figure 2:
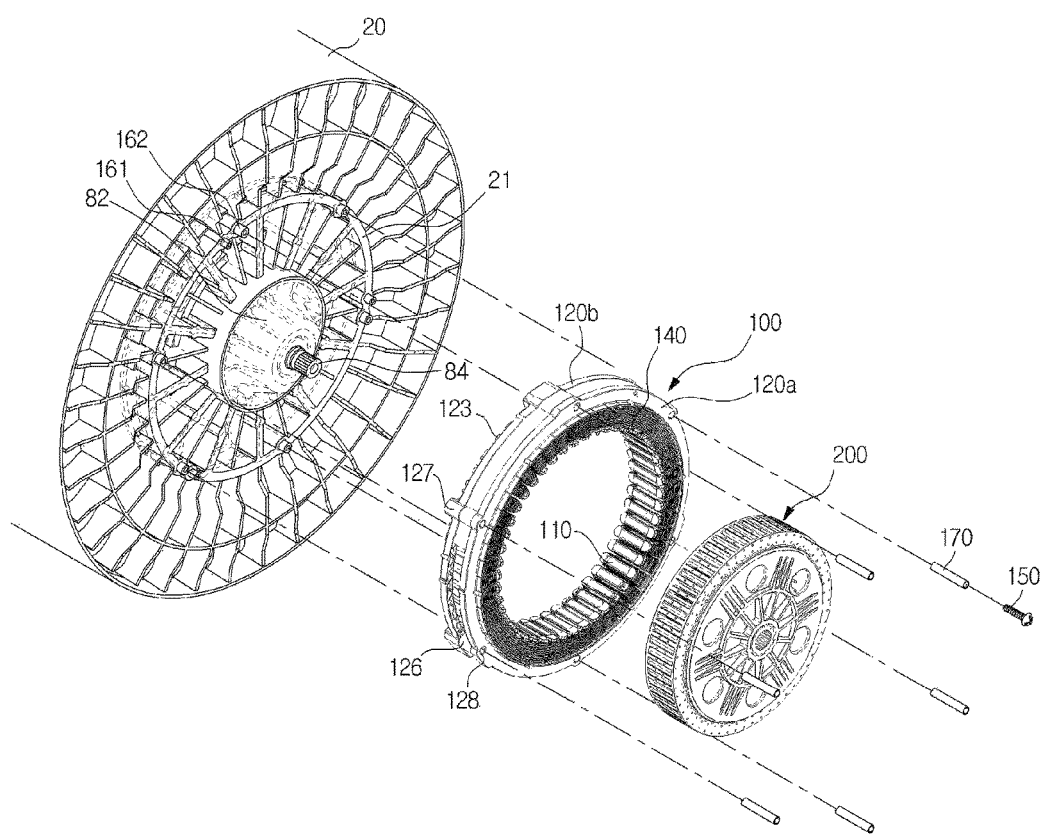
FIG. 2 is a view independently illustrating a tub of the washing machine and a stator and a rotor of an inner rotor type motor according to one embodiment of the present invention.

FIG. 2 is a view independently illustrating the tub of the washing machine, and a stator and a rotor of an inner rotor type motor according to one embodiment of the present invention.

Referring to FIG. 2, the motor 40 according to one embodiment of the present invention includes a stator 100 and a rotor 200. The motor 40 is coupled to the outer side of the tub 20, and rotates the drum 30 in both directions by providing driving force to the drum 30. The stator 100 according to one embodiment of the present invention is mounted at the rear wall of the tub 20. The rotor 200 is disposed around the stator 100 and may be rotated by electromagnetically interacting with the stator 100. The rotor 200 may be provided by alternately arranging a magnet and a rotor core of a metallic material.

The stator 100 includes a stator core 110 of a metallic material, and a first insulator 120a and a second insulator 120b covering both ends of the stator core 110. The stator core 110 may be formed by stacking press-processed metal sheets. Between the first insulator 120a and the second insulator 120b, an insulation film (not shown) may be inserted, and at the first insulator 120a, the second insulator 120b and an insulation film (not shown), a coil may be wound.

At the first insulator 120a, a plurality of connecting ribs 126 connected to the second insulator 120b may be provided. At the connecting ribs 126, a first through hole 128, in which a fixing member 150 to fix the stator 100 to the rear wall 21 of the tub 20 is inserted, may be formed.

At the second insulator 120b, a plurality of fixing ribs 127 connected to the tub 20 may be provided. The fixing ribs 127 may be positioned to protrude toward the rear wall 21 of the tub 20. At the fixing ribs 127, a second through hole (not shown) connected to the first through hole 128 formed at the first insulator 120a may be formed. The second insulator 120b includes a plurality of fixing pins 123 formed to protrude from one surface of the fixing ribs 127 toward the rear wall 21 of the tub 20. At second through hole (not shown), a sleeve 170 for reinforcing a combined strength between the stator 100 and the tub 20 may be inserted.

At the rear wall 21 of the tub 20, in which the stator 100 is mounted, a first accommodation hole 161, in which the fixing pin 123 is inserted and accommodated, and a second accommodation hole 162, in which the fixing member 150 is inserted and accommodated, are provided.

The first accommodation hole 161 accommodates the fixing pin 123, so that the position of the stator 100 may be determined before the stator 100 is fixed to the rear wall 21 of the tub 20, and the second accommodation hole 162 accommodates the fixing member 150 penetrating through a sleeve 170, so that the stator 100 may be fixed to the rear wall 21 of the tub 20.

At one side of the first insulator 120a or the second insulator 120b, a hall sensor assembly 90 may be mounted. At the hall sensor assembly 90, a hall sensor 95 is provided. The hall sensor 95 may be positioned at a front or rear side of the rotor 200 spaced apart from the rotor 200. The hall sensor 95 is positioned at the front or rear side of the rotor 20 to sense a leakage magnetic flux of a magnet included in the rotor 200. The hall sensor 95 senses the leakage magnetic flux of the magnet and transmits information regarding the position of the magnet to a controller (not shown), and the controller (not shown) controls the flow of the current that flows in the coil of the stator 100 according to the transmitted information to rotate the rotor 200.

Hereinafter, a detailed description regarding a structure of the hall sensor assembly mounted in the motor 40 according to one embodiment of the present invention will be given. Hereinafter, based on a rotary shaft included in the tub, a direction in which an end of the rotary shaft faces is defined as the front, a direction toward the rear surface of the tub is defined as the rear.

Figure 3:
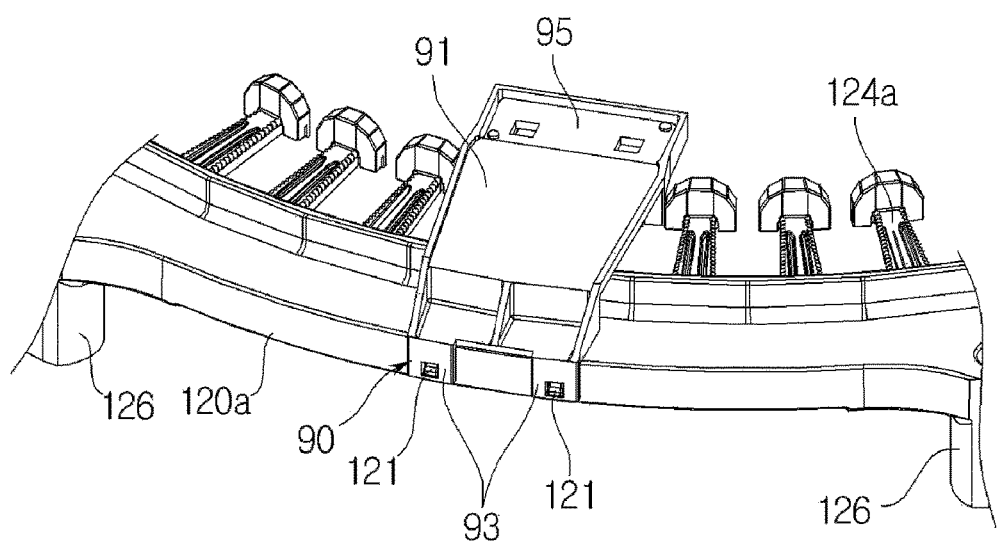
FIG. 3 is a view illustrating a hall sensor assembly which is mounted in the inner rotor type motor according to one embodiment of the present invention.
Figure 4:
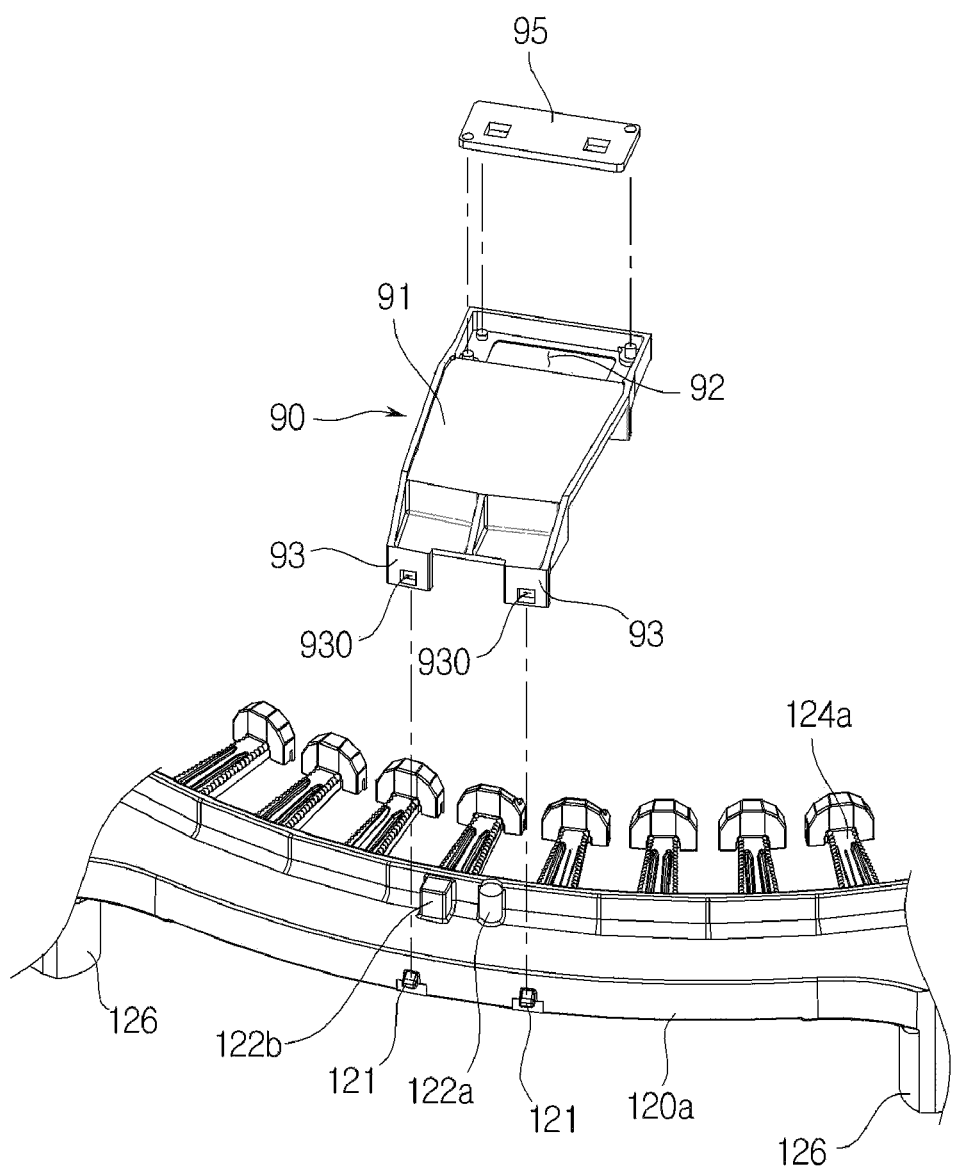
FIGS. 4 and 5 are partially exploded perspective views of FIG. 3.
Figure 5:
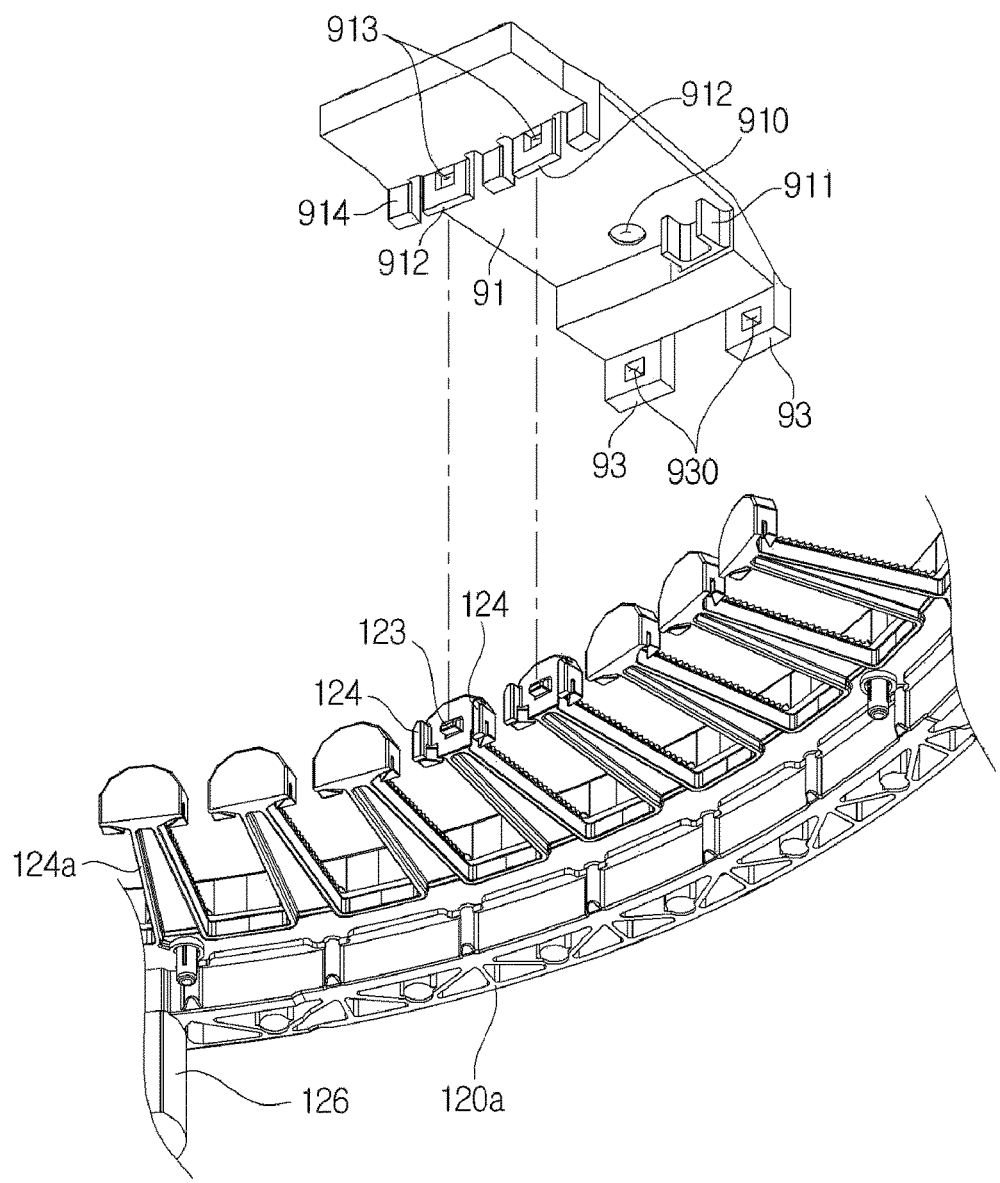

FIG. 3 is a view illustrating the hall sensor assembly which is mounted in the inner rotor type motor according to one embodiment of the present invention, and FIGS. 4 and 5 are partially exploded perspective views of FIG. 3.

Referring to FIGS. 3 to 5, the hall sensor assembly 90 according to one embodiment of the present invention includes a body 91 and a fixer 93. The fixer 93 may be formed to be bent from the body 91. The hall sensor assembly 90 according to one embodiment of the present invention may be mounted on the first insulator 120a such that the hall sensor 950 is positioned at the front or rear of the rotor 200. The hall sensor assembly 90 may be mounted on the first insulator 120a by hooking. The hall sensor assembly 90 may be manufactured of plastic material by injection-molding.

At one side of the body 91, an accommodating portion 92 to accommodate the hall sensor 95 may be provided. The hall sensor assembly 90 may be mounted on the first insulator 120a or the second insulator 120b. Hereinafter, the hall sensor assembly 90 is defined as being mounted on the first insulator 120a, and the description thereof will follow.

The fixer 93 may be formed to be bent from the body 91. When the hall sensor assembly 90 is mounted on the first insulator 120a, the body 91 may be positioned spaced apart from the front of the first insulator 120a, and the fixer 93 may be fixed to be in contact with the outer surface of the first insulator 120a, so that the hall sensor 95 accommodated in the accommodating portion 92 may be positioned at the front of the rotor 200.

At the first insulator 120a, a first hook 121 may be provided to fix the hall sensor assembly 90. The first hook 121 may be formed to protrude at the outer surface of the first insulator 120a. At the fixer 93, a first insertion hole 930, into which the first hook 121 may be inserted, may be formed. The hall sensor assembly 90 may be fixed not to move to the front or rear side of the first insulator 120a when the first hook 121 is inserted into the first insertion hole 930.

At the first insulator 120a, movement preventers 122a, 122b may be provided to protrude. The movement preventers 122a, 122b include a first movement preventer 122a and a second movement preventer 122b.

At the bottom of the body 91 of the hall sensor assembly 90, a movement prevention groove 910, into which the first movement preventer 122a may be inserted, may be formed. When the first movement preventer 122a is inserted into the movement prevention groove 910, the hall sensor assembly 90 is prevented from laterally moving. In the above description, it has been described that the movement prevention groove 910 is formed at the bottom of the body 91 so that the first movement preventer 122a is inserted into the movement prevention groove 910, but it is also possible for a movement prevention hole to be formed at the body 91, so that the first movement preventer 122a is inserted into the movement prevention hole 91.

At the bottom of the body 91 of the hall sensor assembly 90, a holder 911, which surrounds an outer surface of the second movement preventer 122b, may be provided. The holder 911 may be provided to have two protruding ribs which are separated and face each other. Between the two protruding ribs, the second movement preventer 122b may be inserted into the holder 911. The two protruding ribs may be provided to have elasticity to both left and right sides. The distance between the protruding ribs is smaller than the diameter of a cross section of the second movement preventer 122b, and the second movement preventer 122b is inserted into the holder 911 and fixed, so that lateral movement may be limited.

At the first insulator 120a, a plurality of insulator teeth 124a protruding in an inner radial direction are provided. At one side of the insulator teeth 124a, a second hook 123 to fix the hall sensor assembly 90 may be provided. The second hook 123 may be formed at the one side which is positioned at an end of the insulator teeth 124a.

At the bottom of the body 91 of the hall sensor assembly 90, a protrusion 912 may be formed, and at the protrusion 912, a second insertion hole 913, which the second hook 123 may be inserted, may be formed. The hall sensor assembly 90 may be fixed not to move to the front or rear side of the first insulator 120a when the second hook 123 is inserted into the second insertion hole 913.

At the one side of the insulator teeth 124a at which the second hook 123 is provided, an interferer 124 may be formed to protrude. When the second hook 123 is inserted into the second insertion hole 913, the lateral movements of the protrusion 912 may be prevented by the interferer 124.

At the bottom of the body 91 of the hall sensor assembly 90, a fixer 914 may be provided to protrude. The fixer 914 may be provided at both left and right sides of the protrusion 912, respectively. The fixer 914 may be provided, so that the interferer 124 is placed between the protrusion 912 and the fixer 914 when the second hook 123 is inserted into the second insertion hole 913. When the interferer 124 is inserted between the protrusion 912 and the fixer 914, the hall sensor assembly 90 is prevented from moving to the left and right.

As the above description, the first hook 121 of the first insulator 120a is inserted at the first insertion hole 930, which is formed at the fixer 93 to be bent from body 91 of the hall sensor assembly 90, and the second hook 123 formed at the insulator teeth 124a is inserted into the second insertion hole 913, which is formed at the protrusion 912 formed at the bottom of the body 91 positioned in the inner radial direction of the first insulator 120a, so that the hall sensor assembly 90 may be mounted on the first insulator 120a.

The first movement preventer 910 or the second movement preventer 910 provided on the first insulator 120a are inserted through the movement prevention groove 910 or the holder 911 formed at the body 91, so that the hall sensor assembly 90 is prevented from moving to the left and right. At the first insulator teeth 124a in which the second hook 123 is formed, the interferer 124 is provided, and when the interferer 124 is inserted between the protrusion 912 and the fixer 914, which are formed at the bottom of the body 91, the hall sensor assembly 90 is mounted on the first insulator 120a and fixed so as to not move to the left and right.

Figure 6:
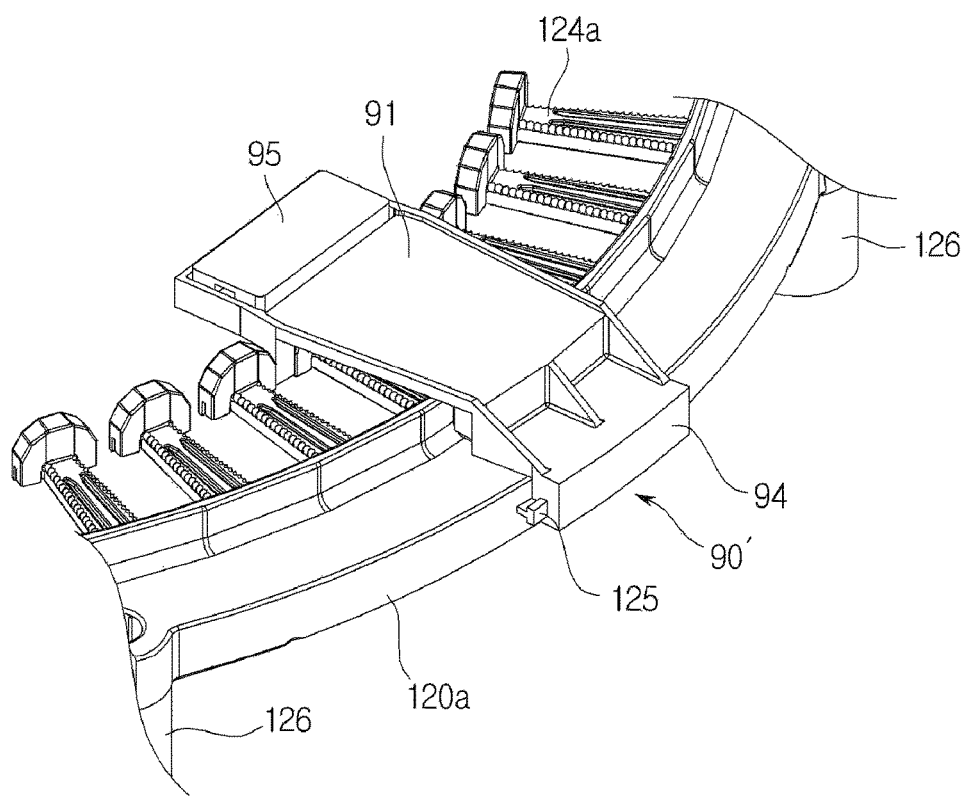
FIG. 6 is a view illustrating a hall sensor assembly according to another embodiment of the present invention which is mounted in the inner rotor type motor of the present invention.
Figure 7:
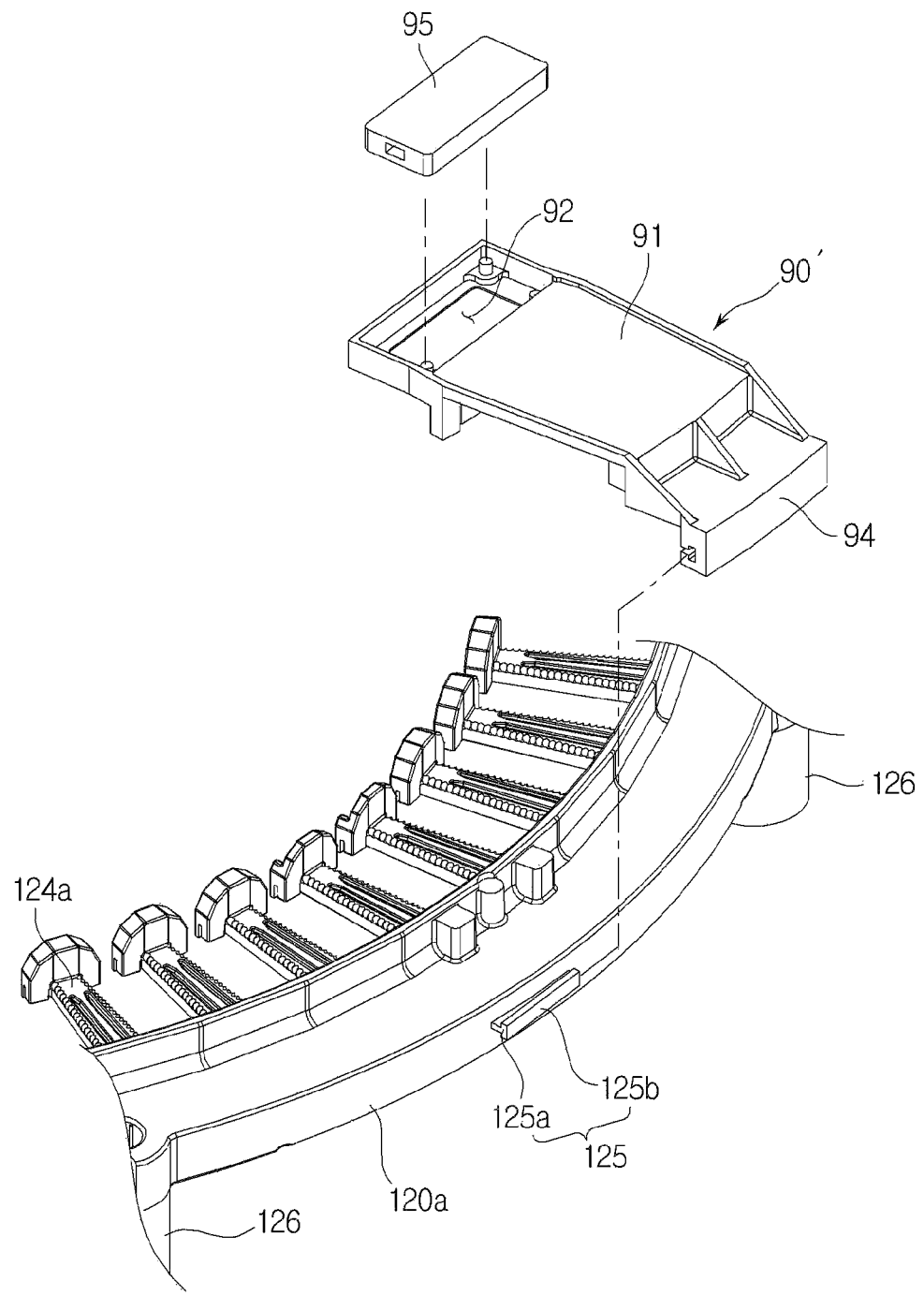
FIGS. 7 and 8 are partially exploded perspective views of FIG. 6.
Figure 8:
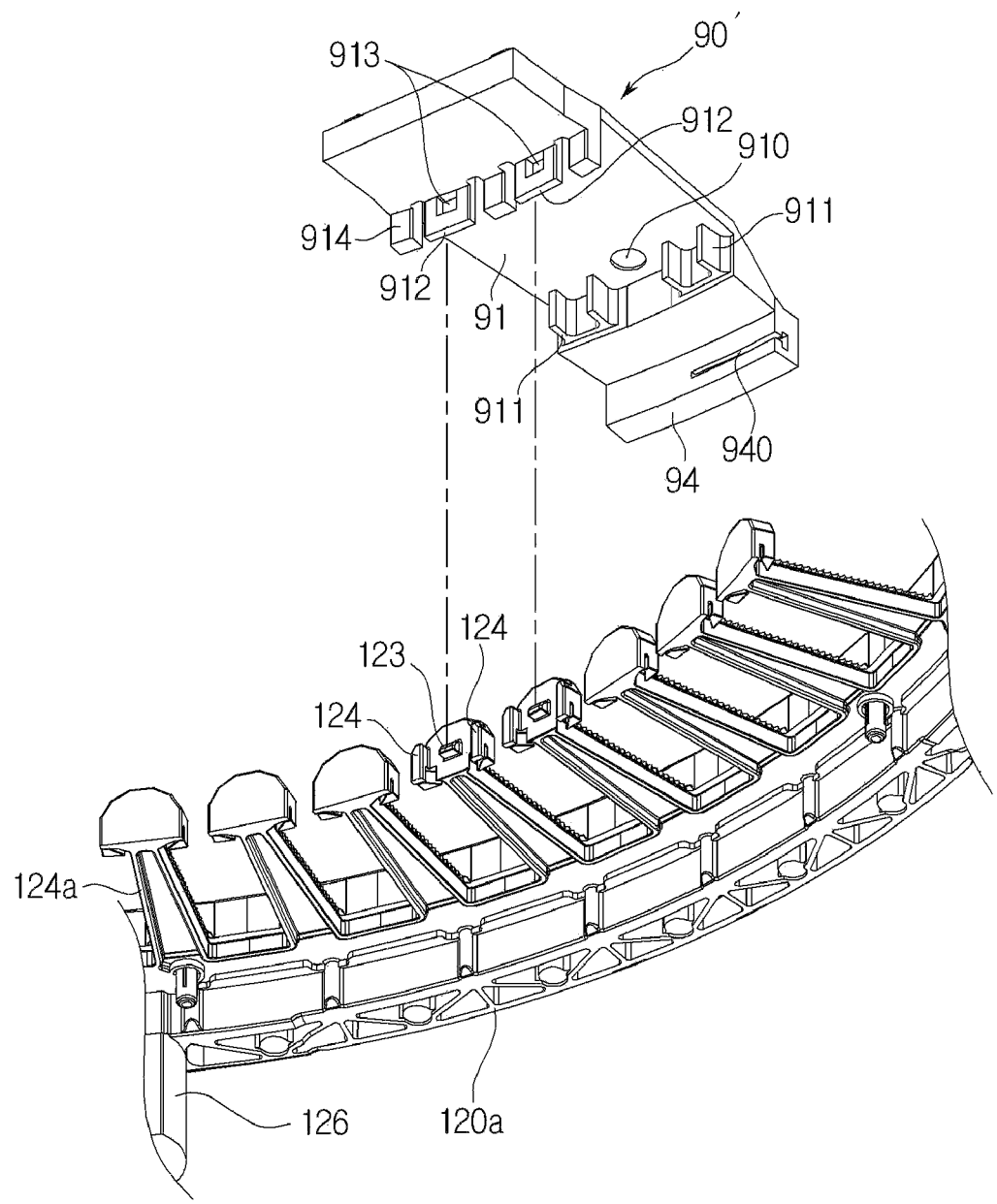

FIG. 6 is a view illustrating a hall sensor assembly according to another embodiment of the present invention which is mounted in the inner rotor type motor of the present invention, and FIGS. 7 and 8 are partially exploded perspective views of FIG. 6.

Referring to FIGS. 6 and 8, a hall sensor assembly 90' according to another embodiment of the present invention may be mounted on the first insulator 120a by sliding and hooking. Specifically, one side of the hall sensor assembly 90' may be mounted on the first insulator 120a by sliding, and the other side of the hall sensor assembly 90' may be mounted on the first insulator 120a by hooking.

The hall sensor assembly 90' according to another embodiment of the present invention includes a body 91 and a fixer 94, and the fixer 94 may be formed to be bent from the body 91. At the body 91, an accommodating portion 92, which may accommodate a hall sensor 95, may be provided. At the accommodating portion 92, the hall sensor 95 is accommodated, and when the hall sensor assembly 90' is mounted on the first insulator 120a, the hall sensor 95 may be positioned at the front of the rotor 200.

One side of a hall sensor assembly 90' may be mounted on the first insulator 120a by sliding. At the outer surface of the first insulator 120a, a rail 125 may be provided. At a fixer 94 of the hall sensor assembly 90', a rail groove 940, into which the rail 125 may be inserted, may be formed. A shape of the rail groove 940 may be provided to correspond to a shape of the rail 125. The fixer 94 may be mounted on the first insulator 120a by the rail groove 940 sliding along the rail 125.

The rail 125 may include a first rail 125a vertically protruding from the outer surface of the first insulator 120, and a first rail 125b formed at an end of the first rail 125a to be perpendicular to the first rail 125a. The rail groove 940 may be formed to correspond to the shapes of the first rail 125a and the second rail 125b. Accordingly, the rail 125 may not fall out of the rail groove 940 by vertically forming the second rail 125b from the first rail 125a. Accordingly, the fixer 94 may be mounted and fixed on the first insulator 120a.

The other side of the hall sensor assembly 90' may be coupled with the first insulator teeth 124a by hooking similar to the one embodiment of the present invention. Specifically, at one side of the first insulator teeth 124a, the second hook 123 to fix the hall sensor assembly 90 is provided, and at the bottom of the body 91 of the hall sensor assembly 90', a protrusion 912 in which an insertion hole 913 is formed may be provided. In the insertion hole 913 of the hall sensor assembly 90', the second hook 123 is inserted and coupled by a hook, so that the hall sensor assembly 90' may be coupled to the first insulator 120a.

At the one side positioned at the end of the insulator teeth 124a in which the second hook 123 is provided, the interferer 124 may be formed to protrude. When the second hook 123 is inserted into the second insertion hole 913, the protrusion 912 may be prevented from laterally moving by the interferer 124.

At the bottom of the body 91 of the hall sensor assembly 90, a fixer 914 may be provided to protrude. The fixer 914 may be provided on both left and right sides of the protrusion 912. The fixer 914 may be provided to place the interferer 124 between the protrusion 912 and the fixer 914 when the second hook 123 is inserted into the second insertion hole 913. The hall sensor assembly 90 may be prevented from moving to the left and right by inserting the interferer 124 between the protrusion 912 and the fixer 914.

Figure 9:
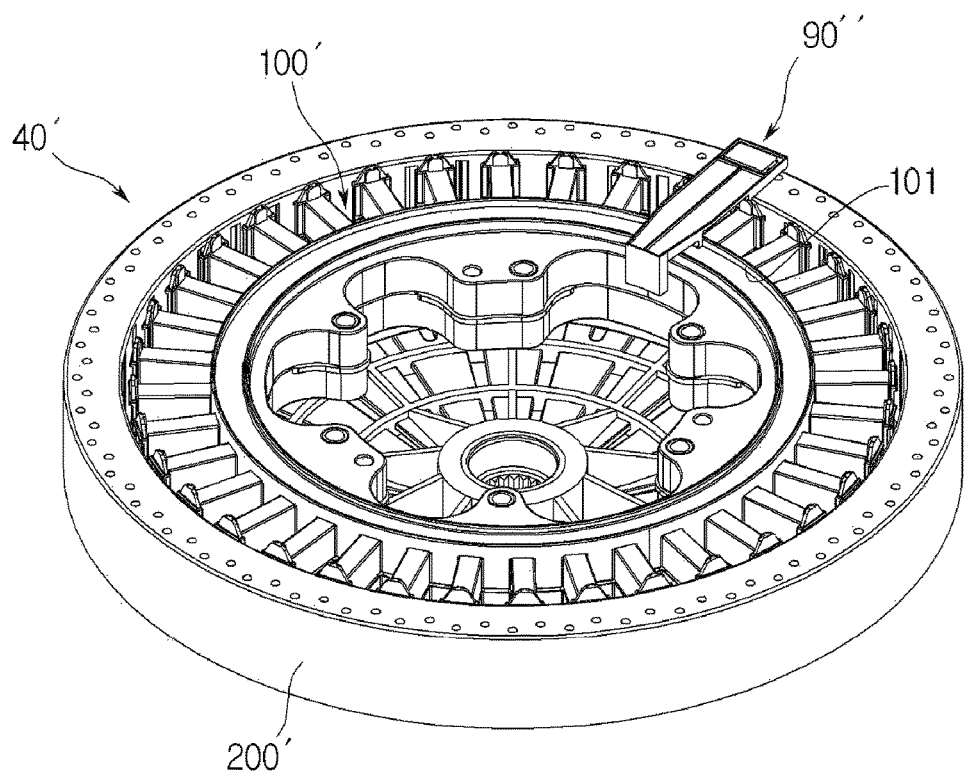
FIG. 9 is a view illustrating a hall sensor assembly according to one embodiment of the present invention which is mounted in an outer rotor type motor.
Figure 10:
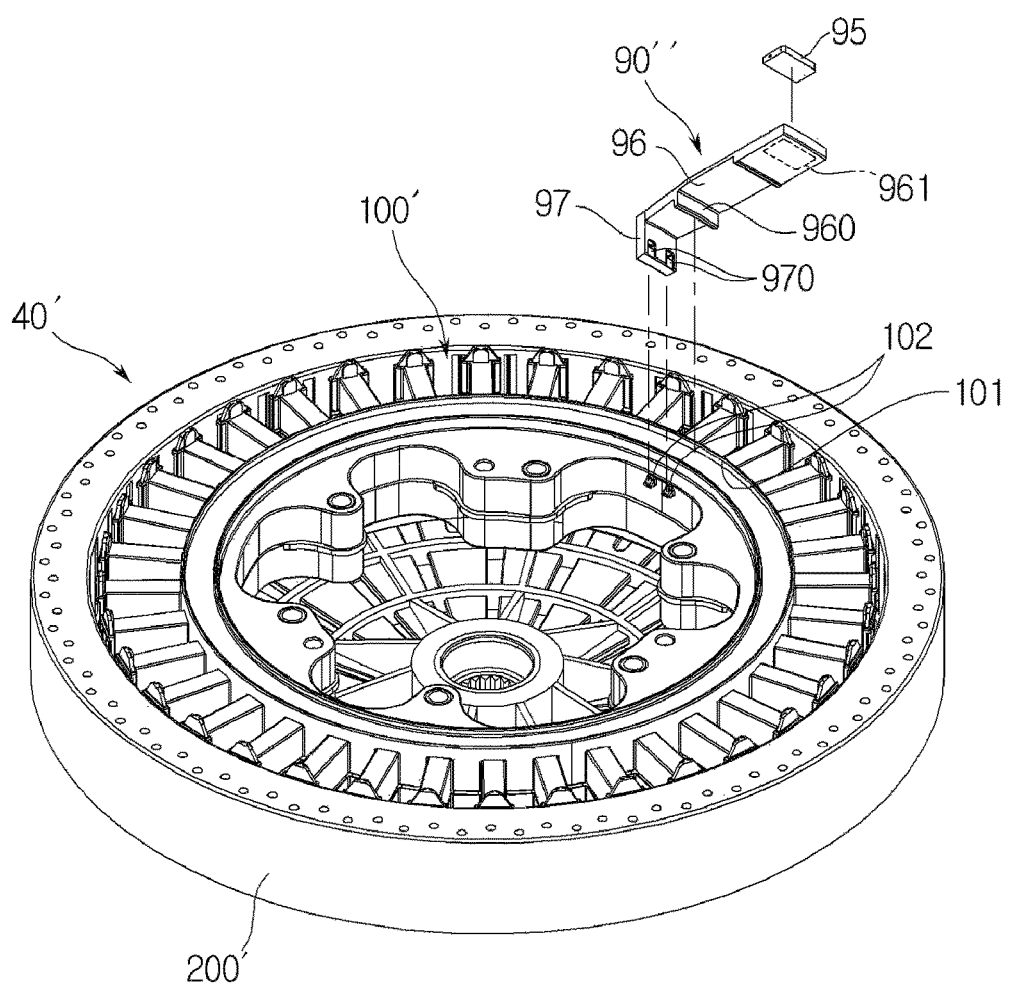
FIG. 10 is a partially exploded perspective view of FIG. 9.

FIG. 9 is a view illustrating a hall sensor assembly according to one embodiment of the present invention which is mounted in an outer rotor type motor, and FIG. 10 is partially exploded perspective view of FIG. 9.

Referring to FIGS. 9 and 10, a hall sensor assembly 90" according to one embodiment of the present invention may be mounted in an outer rotor type motor 40' by hooking. In the outer rotor type motor 40', a stator 100' is positioned at an inner side, and a rotor 200' is positioned outside. A molding portion of the rotor 200' may be ejected by inserting a serration coupled to a rotary shaft 84 which is provided on a rear surface of the tub 20 so that the molding portion may be mounted on the tub 20 and rotate the drum 30.

The stator 100' of the outer rotor type motor 40' may be provided to place an insulator inside of the motor and place insulator teeth toward the rotor 200' positioned outside of the motor. The insulator may be formed in a circular shape, and the insulator teeth may be provided to face the outside of the motor, in which the rotor 200' is disposed, from an outer surface of the insulator.

At the insulator, a rib 101 may be formed to protrude toward the front. The rib 101 may be provided in concentric circles with the serration. At the inner surface of the insulator, a hook 102 may be formed to protrude.

The hall sensor assembly 90" includes a body 96 and a fixer 97 bent from the body 96. At the body 96, an accommodating portion 961, in which the hall sensor 95 may be accommodated, may be formed. When the hall sensor assembly 90" is mounted in the motor 40', the hall sensor 95 may be provided to be positioned at the front of the rotor 200' positioned outside of the stator 100'.

At the bottom of the body 96, a movement preventer 960 may be formed to protrude. When the hall sensor assembly 90" is mounted in the motor 40', the movement preventer 960 is interfered with by the rib 101 formed at the insulator, so that the hall sensor assembly 90" is prevented from moving.

At the fixer 97, an insertion hole 970 may be formed. When the hook 103a formed at the insulator is inserted into the insertion hole 970, the hall sensor assembly 90" may be fixed to the stator 90'.

Accordingly, the hall sensor assembly 90" may be mounted in the outer rotor type motor 40' to place the hall sensor 95 at the front of the rotor 200'. Additionally, the hall sensor assembly 90" is prevented from moving by the movement preventer 960 which is formed at the bottom of the hall sensor assembly 90", so that the hall sensor assembly 90" may be fixed to the stator while being mounted.

Figure 11:
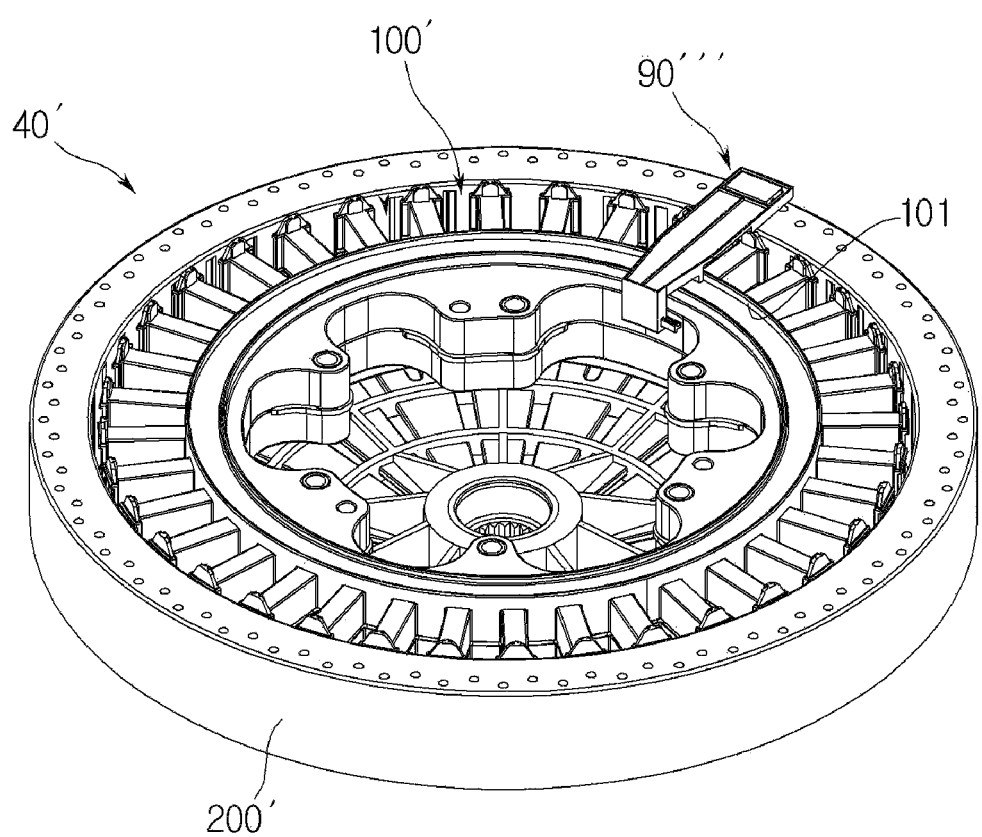
FIG. 11 is a view illustrating a hall sensor assembly according to another embodiment of the present invention which is mounted in the outer rotor type motor.
Figure 12:
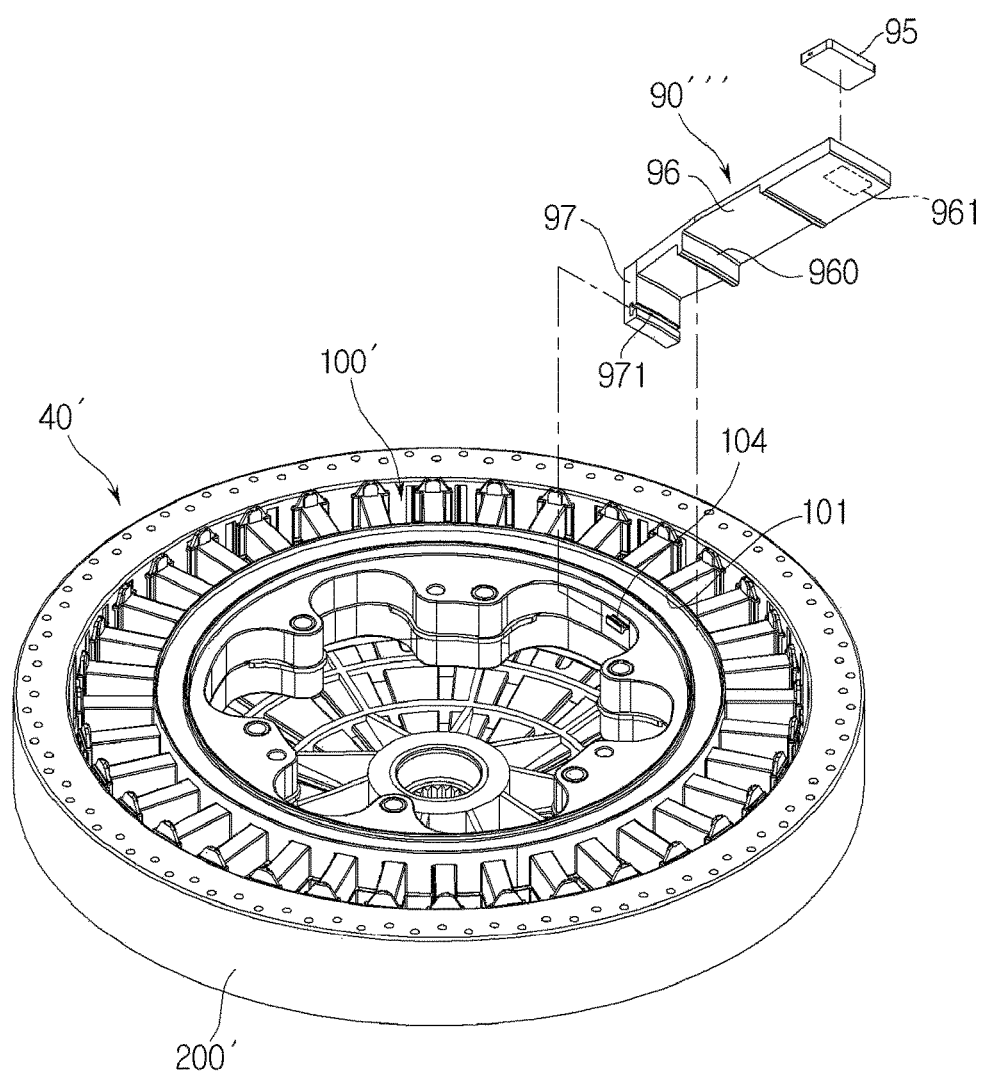
FIG. 12 is a partially exploded perspective view of FIG. 11.

FIG. 11 is a view illustrating a hall sensor assembly according to another embodiment of the present invention which is mounted in the outer rotor type motor, and FIG. 12 is partially exploded perspective view of FIG. 11.

Referring to FIGS. 11 and 12, a hall sensor assembly 90''' according to another embodiment of the present invention may be coupled to the outer rotor type motor 40' by sliding.

At the insulator, the rib 101 may be formed to protrude toward. At the inner surface of the insulator, a rail 104 may be formed to protrude.

The hall sensor assembly 90''' includes a body 96 and a fixer 97 bent from the body 96. At the body 96, an accommodating portion 961, in which the hall sensor 95 may be accommodated, may be formed. When the hall sensor assembly 90''' is mounted in the motor 40', the hall sensor 95 may be provided to be positioned at the front of rotor 200' which is positioned at the outside of the stator 100'.

At the bottom of the body 96, a movement preventer 960 may be formed to protrude. When the hall sensor assembly 90''' is mounted in the motor 40', the movement preventer 960 is interfered with by the rib 101 which is formed at the insulator to prevent the hall sensor assembly 90''' from moving.

At the inner surface of the insulator, a rail 104 may be formed to protrude. At the fixer 97, a rail groove 970 may be formed. The rail groove 970 may be provided to correspond to the shape of the rail 104. The fixer 97 may be fixed to the insulator when the rail 104 is inserted into the rail groove 970 and slide along the rail 104.

Accordingly, the hall sensor assembly 90''' is mounted in the motor 40', and the hall sensor 95 may be positioned at the front of the rotor 200' spaced apart from the rotor 200'. Additionally the movement preventer 960 is interfered with by the rib 101, so that the hall sensor assembly 90''' may be fixed not to move in a state of being mounted in the stator.

Accordingly, when the hall sensor assembly is mounted in the stator by hooking or sliding, the hall sensor assembly may be detachably mounted in the motor. When an error is found in the hall sensor, the hall sensor assembly in which the hall sensor is accommodated may be easily mounted in the motor after separating the hall sensor assembly and changing the hall sensor.

When the hall sensor assembly is mounted in the motor, the hall sensor may be positioned at the front of the rotor spaced apart from the rotor. The hall sensor may sense the position of the magnet by sensing a leakage magnetic flux of the magnet provided at the rotor, at front or rear side of the rotor.

The hall sensor is positioned at the front or rear side of the rotor, and senses the leakage magnetic flux of the magnet provided in the rotor, so that the hall sensor can accurately sense the position of the magnet by minimizing an influence of an electric field which is generated when electricity flows to the stator, and the reliability of the detection of the hall sensor can be increased since the generation rate of the leakage magnetic flux in the direction of the shaft is higher than the detection rate of the hall sensor by more than 4 times.

Additionally, since the hall sensor assembly is provided as an injection product, the hall sensor assembly may not significantly affect a deformation of the structure of the motor in which the hall sensor assembly is mounted, and sufficient distance between the hall sensor assembly and the rotor may be secured, so that the hall sensor assembly is prevented from generating interference with the rotor when the motor is actually driven.

The invention claimed is:

1. A washing machine comprising:
   a tub;
   a drum rotatably disposed inside the tub;
   a motor coupled to an outside of the tub to rotationally drive the drum, and including a stator and a rotor;
   a hall sensor assembly detachably mounted in the motor; and
   a hall sensor provided on the hall sensor assembly, and positioned at a front of the rotor to sense a leakage magnetic flux of a magnet which is included in the rotor,
   wherein a rail groove is formed at the hall sensor assembly, a rail is formed at the stator, and the hall sensor assembly is mounted in the stator by sliding the hall sensor assembly along the rail while the rail is inserted into the rail groove, and
   wherein the rail comprises a first rail perpendicularly formed from a surface of the stator, and a second rail perpendicularly formed at the first rail.

2. The washing machine according to claim 1, wherein an insertion hole is formed at the hall sensor assembly, a hook is formed to protrude at the stator, and the hall sensor assembly is mounted in the motor by inserting the hook into the insertion hole.

3. The washing machine according to claim 1, wherein a movement preventer is formed to protrude at the stator, a movement prevention groove is formed at the hall sensor assembly, and the hall sensor assembly is fixed not to move by inserting the movement preventer into the movement prevention groove.

4. The washing machine according to claim 1, wherein a movement preventer is formed to protrude at the stator, a holder is provided at the hall sensor assembly, and the hall sensor assembly is fixed not to move by inserting the movement preventer into the holder and fixed.

5. The washing machine according to claim 1, wherein the stator is positioned at an outer side of the rotor.

6. The washing machine according to claim 5, wherein the stator includes a plurality of insulator teeth protruding toward the rotor, and a hook is formed to protrude at an end of the insulator teeth.

7. The washing machine according to claim 6, wherein a protrusion formed at an insertion hole is formed at the hall sensor assembly, and the hook is inserted into the insertion hole to fix the hall sensor assembly.

8. The washing machine according to claim 7, wherein an interferer is formed to protrude at an end of the insulator teeth, and the protrusion is fixed not to move by the interferer when the hook is inserted into the insertion hole.

9. The washing machine according to claim 8, wherein a fixer is provided to protrude at the hall sensor assembly, and when the hook is inserted into the insertion hole, the interferer is inserted between the protrusion and the fixer, so that the hall sensor assembly is fixed.

10. The washing machine according to claim 5, wherein the hall sensor assembly is mounted in the stator, and the hall sensor provided on the hall sensor assembly is positioned at the front of the rotor spaced apart from the rotor.

11. The washing machine according to claim 1, wherein the rotor is provided on an outer side of the stator.

12. The washing machine according to claim 11, wherein a rib protruding forward is formed at the stator.

13. The washing machine according to claim 12, wherein, a movement preventer is formed to protrude at the hall sensor assembly, and the movement preventer is interfered by the rib to fix the hall sensor assembly not to move.

14. A motor comprising:
   a stator having an insulator in which a coil is wound and a plurality of insulator teeth protruding from the insulator;

a rotor;

a hall sensor assembly detachably mounted on the stator; and a hall sensor accommodated in the hall sensor assembly and configured to sense a leakage magnetic flux of a magnet at a front of the rotor, wherein a rail groove is formed at the hall sensor assembly, a rail is formed at the stator, and the hall sensor assembly is mounted in the stator by sliding the hall sensor assembly along the rail while the rail is inserted into the rail groove, and wherein the rail comprises a first rail perpendicularly formed from a surface of the stator, and a second rail perpendicularly formed at the first rail.

15. The motor according to claim 14, wherein a hook is formed to protrude at the insulator, an insertion hole is formed at the hall sensor assembly, and the hall sensor assembly is fixed to the insulator by inserting the hook into the insertion hole.

16. The motor according to claim 14, wherein the hall sensor assembly and the insulator comprise a movement prevention structure for preventing the hall sensor assembly from moving.

17. The motor according to claim 14, wherein the hall sensor assembly is formed of a plastic material by injection-molding.

* * * * *